(12) United States Patent
Feng et al.

(10) Patent No.: US 8,917,157 B2
(45) Date of Patent: *Dec. 23, 2014

(54) TOUCH PANEL

(71) Applicant: Beijing FUNATE Innovation Technology Co., Ltd., Beijing (CN)

(72) Inventors: Chen Feng, Beijing (CN); Yu-Quan Wang, Beijing (CN); Li Qian, Beijing (CN)

(73) Assignee: Beijing FUNATE Innovation Technology Co., Ltd., Beijing (CN)

( * ) Notice: Subject to any disclaimer, the term of this patent is extended or adjusted under 35 U.S.C. 154(b) by 10 days.

This patent is subject to a terminal disclaimer.

(21) Appl. No.: 13/863,825

(22) Filed: Apr. 16, 2013

(65) Prior Publication Data

US 2014/0145817 A1  May 29, 2014

(30) Foreign Application Priority Data

Nov. 23, 2012  (CN) .......................... 2012 1 0481057

(51) Int. Cl.
*H01C 10/10* (2006.01)
*G06F 3/045* (2006.01)
*B82Y 30/00* (2011.01)

(52) U.S. Cl.
CPC .............. *G06F 3/045* (2013.01); *H01C 10/106* (2013.01); *B82Y 30/00* (2013.01)
USPC ........................................... 338/47; 345/173

(58) Field of Classification Search
CPC ...... G06F 3/045; H01C 10/10; H01C 10/106; H01C 10/103; H01C 17/06586
USPC ........................ 338/47, 13, 19, 114, 210, 333
See application file for complete search history.

(56) References Cited

U.S. PATENT DOCUMENTS

| 5,853,877 | A  | * | 12/1998 | Shibuta ......................... 428/357 |
| 7,630,040 | B2 | * | 12/2009 | Liu et al. ........................ 349/123 |
| 7,947,977 | B2 | * | 5/2011  | Jiang et al. ..................... 257/40 |
| 2009/0056854 | A1 | * | 3/2009 | Oh et al. ......................... 156/60 |
| 2010/0007625 | A1 | * | 1/2010 | Jiang et al. ..................... 345/173 |
| 2014/0145980 | A1 | * | 5/2014 | Feng et al. ..................... 345/173 |

* cited by examiner

*Primary Examiner* — Kyung Lee
(74) *Attorney, Agent, or Firm* — Novak Druce Connolly Bove + Quigg LLP

(57) ABSTRACT

A resistance-type touch panel includes a first electrode plate and the second electrode plate spaced from and opposite to the first electrode plate. The first electrode plate includes a first substrate and a first transparent conductive layer. The second electrode plate includes a second substrate and a second transparent conductive layer. The first transparent conductive layer includes a carbon nanotube film. The carbon nanotube film includes a number of carbon nanotube wires substantially parallel with each other and a number of carbon nanotube clusters located between the number of carbon nanotube wires. The carbon nanotube wires extend along an X direction and are spaced from each other along a Y direction. The carbon nanotube clusters between each adjacent two of the carbon nanotube wires are spaced from each other along the X direction. The X direction is intercrossed with the Y direction.

20 Claims, 8 Drawing Sheets

TOUCH PANEL

CROSS-REFERENCE TO RELATED APPLICATIONS

This application claims all benefits accruing under 35 U.S.C. §119 from China Patent Applications: Application No. 201210481057.9, filed on Nov. 23, 2012 in the China Intellectual Property Office, disclosures of which are incorporated herein by references.

BACKGROUND

1. Technical Field

The present disclosure relates to resistance-type touch panels, particularly to a carbon nanotube based resistance-type touch panel.

2. Description of Related Art

In recent years, various electronic apparatuses such as mobile phones, car navigation systems have advanced toward high performance and diversification. There is continuous growth in the number of electronic apparatuses equipped with optically transparent touch panels in front of their display devices such as liquid crystal panels. A user of such electronic apparatus operates it by pressing a touch panel with a finger or a stylus while visually observing the display device through the touch panel. Thus a demand exists for such touch panels which superior in visibility and reliable in operation.

Different types of touch panels, including a resistance-type, a capacitance-type, an infrared-type and a surface sound wave-type have been developed. A conventional resistance-type touch panel includes a first substrate, a first optically transparent conductive layer located on the first substrate, a second substrate, a second optically transparent conductive layer located on the second substrate, the first optically transparent conductive layer and the second optically transparent conductive layer are opposite to each other, and a plurality of dot spacers formed between the first optically transparent conductive layer and the second optically transparent conductive layer. The first optically transparent conductive layer and the second optically transparent conductive layer are formed of conductive indium tin oxide (ITO). In operation, an upper surface of the first substrate is pressed with a finger, a pen or the like tool. This causes the first substrate to be deformed, and the first optically transparent conductive layer to come in contact with the second optically transparent conductive layer at a position being pressed. Voltages are applied successively from an electronic circuit to the first optically transparent conductive layer and the second optically transparent conductive layer. Thus, the deformed position can be detected by the electronic circuit.

However, the ITO layer has poor wearability, low chemical endurance and uneven resistance in an entire area of the panel. All the above-mentioned problems of the ITO layer produce a touch panel with low sensitivity, accuracy, and brightness.

What is needed, therefore, is to provide a resistance-type touch panel which can overcome the short come described above.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

References will now be made to the drawings to describe, in detail, various embodiments of the present resistance-type touch panels.

Figure 1:
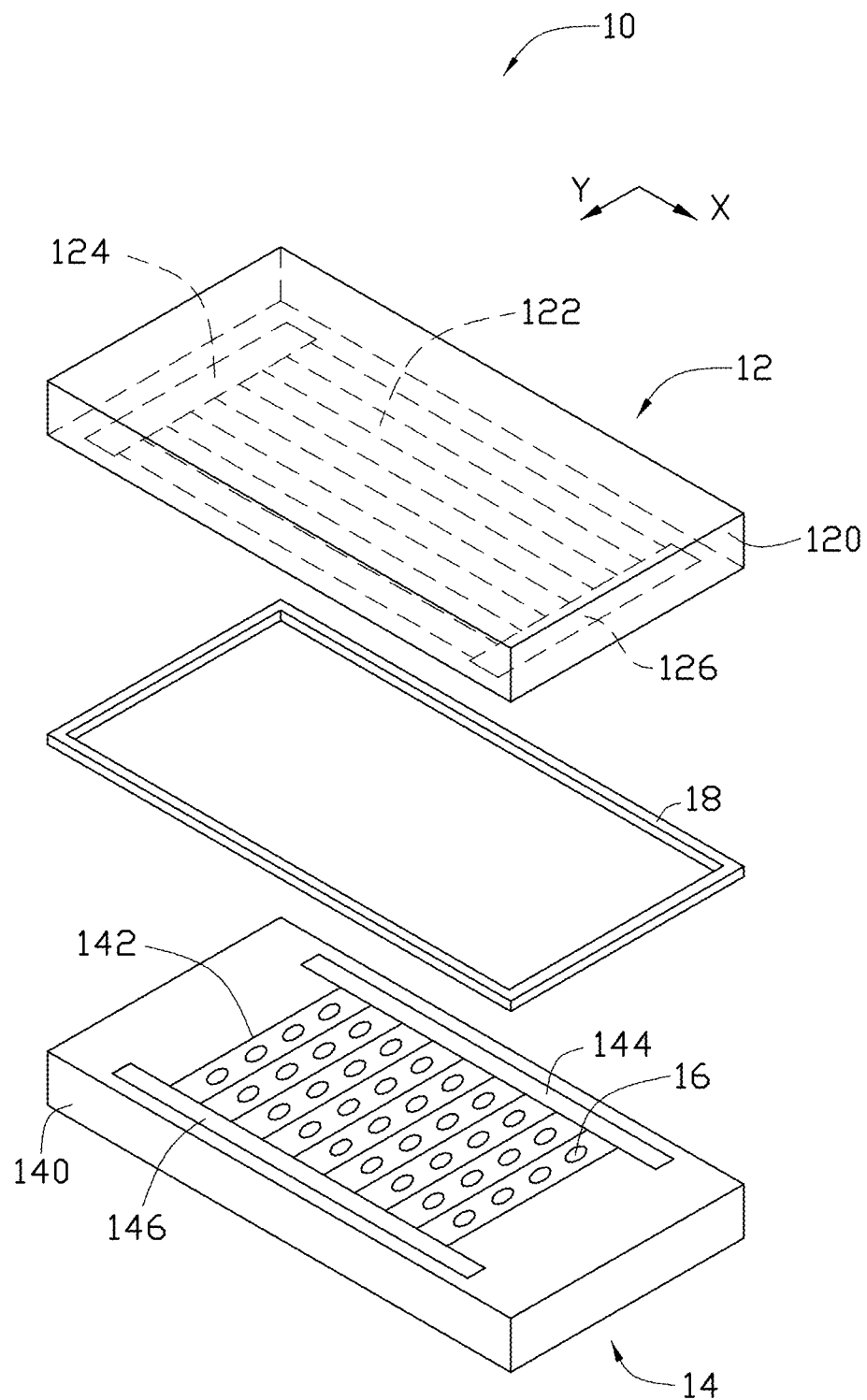
FIG. 1 is a schematic view of one embodiment of a resistance-type touch panel.
Figure 2:
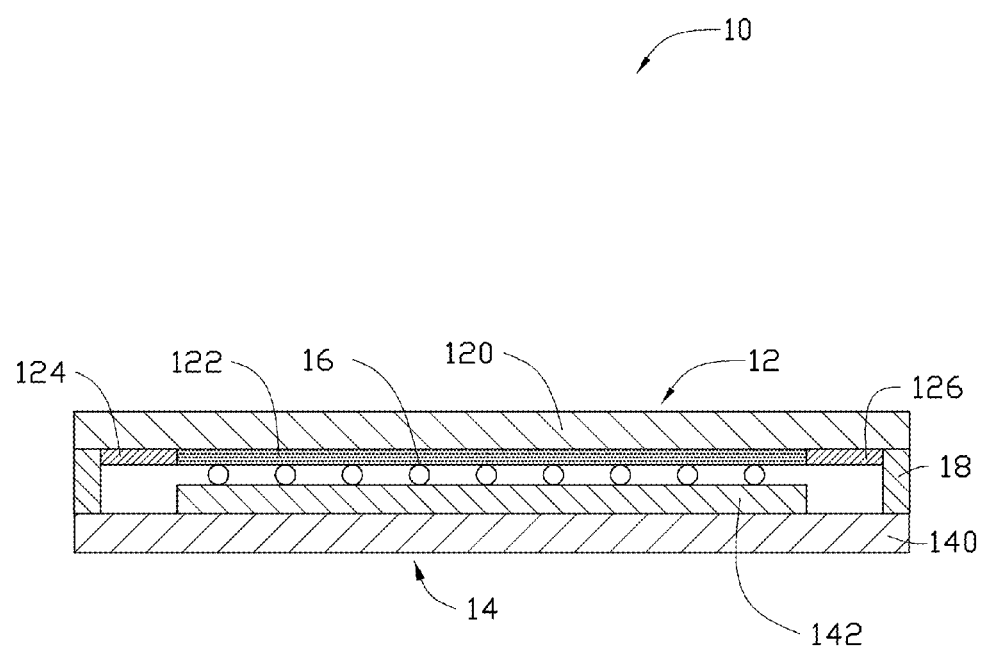
FIG. 2 is a cross-section view of the touch panel of FIG. 1 along X direction.

Referring to FIGS. 1 and 2, a resistance-type touch panel 10 of one embodiment includes a first electrode plate 12, a second electrode plate 14, a plurality of dot spacers 16, and an insulating frame 18.

The first electrode plate 12 is spaced from and opposite to the second electrode plate 14. The distance between the first electrode plate 12 and the second electrode plate 14 is in a range from about 2 micrometers to about 10 micrometers. The plurality of dot spacers 16 are located between the first electrode plate 12 and the second electrode plate 14. The insulating frame 18 is located between and on the periphery of the first electrode plate 12 and the second electrode plate 14.

The first electrode plate 12 includes a first substrate 120, a first transparent conductive layer 122, a first electrode 124, and a second electrode 126. The first substrate 120 is substantially flat and includes first surface (not labeled). The first transparent conductive layer 122, the first electrode 124, and the second electrode 126 are located on the first surface of the first substrate 120. The first electrode 124 and the second electrode 126 are spaced from each other and located on two opposite sides of the first transparent conductive layer 122. The first electrode 124 and the second electrode 126 are substantially in parallel and extend along a Y direction. The first electrode 124 and the second electrode 126 are electrically connected with the first transparent conductive layer 122.

The second electrode plate 14 includes a second substrate 140, a second transparent conductive layer 142, a third electrode 144, and a fourth electrode 146. The second substrate 140 is substantially flat and includes a second surface (not labeled). The second transparent conductive layer 142, the third electrode 144, and the fourth electrode 146 are located on the second surface of the second substrate 140. The third electrode 144 and the fourth electrode 146 are spaced from each other and located on two opposite ends of the second transparent conductive layer 142. The third electrode 144 and the fourth electrode 146 are substantially parallel and extend along an X direction. The X direction and the Y direction are not parallel. The third electrode 144 and the fourth electrode 146 are electrically connected with the second transparent conductive layer 142. The second transparent conductive layer 142 is opposite to and spaced from the first transparent conductive layer 122. In one embodiment, the X direction is substantially perpendicular with the Y direction. That is, the third electrode 144 and the fourth electrode 146 are perpendicular with the first electrode 124 and the second electrode 126.

The first substrate 120 and the second substrate 140 can be a film or a plate. The first substrate 120 and the second substrate 140 can be transparent or opaque. The first substrate 120 and the second substrate 140 can be flexible or rigid. The first substrate 120 and the second substrate 140 can be made of rigid materials such as glass, quartz, diamond, plastic or any other suitable material. The first substrate 120 and the second substrate 140 can be made of flexible materials such as polycarbonate (PC), polymethyl methacrylate acrylic (PMMA), polyethylene terephthalate (PET), polyether polysulfones (PES), polyvinyl polychloride (PVC), benzocyclobutenes (BCB), polyesters, polyimide (PI), polyethylene (PE), acrylonitrile-butadiene-styrene copolymer (ABS), polyamide (PA), polybutylene terephthalate (PBT), acrylic resins, or mixture thereof. The mixture can be PC/ABS, PC/PBT, PC/PET, or PC/PMMA. The first substrate 120 and the second substrate 140 can also be a printed-wiring board (PWB). The thickness of the first substrate 120 and the second substrate 140 can be in a range from about 0.1 millimeters to about 1 centimeter. In one embodiment, both the first substrate 120 and the second substrate 140 are made of PET film with a thickness of about 0.5 millimeters. Material and thickness of the first substrate 120 and the second substrate 140 can be the same or different.

The first electrode 124, the second electrode 126, the third electrode 144 and the fourth electrode 146 can be made of material such as metal, carbon nanotubes, conductive polymer, conductive silver paste, or ITO. The first electrode 124, the second electrode 126, the third electrode 144 and the fourth electrode 146 can be made by etching a metal film, etching an ITO film, or printing a conductive silver paste. In one embodiment, the first electrode 124, the second electrode 126, the third electrode 144 and the fourth electrode 146 are made of conductive silver paste and made by printing conductive silver paste concurrently. When the first substrate 120 and the second substrate 140 are flexible, the first electrode 124, the second electrode 126, the third electrode 144 and the fourth electrode 146 should also be flexible.

Alternatively, all of the first electrode 124, the second electrode 126, the third electrode 144 and the fourth electrode 146 can be located on one of the first substrate 120 and the second substrate 140. In one embodiment, all of the first electrode 124, the second electrode 126, the third electrode 144 and the fourth electrode 146 can be located on the second substrate 140. The first electrode 124 and the second electrode 126 are spaced from each other along the X direction and electrically connected with the second transparent conductive layer 142. The third electrode 144 and the fourth electrode 146 are spaced from each other along the Y direction and electrically connected with the second transparent conductive layer 142.

At least one of the first transparent conductive layer 122 and the second transparent conductive layer 142 includes a carbon nanotube film 1220 as shown in FIGS. 3-7. In one embodiment, both the first transparent conductive layer 122 and the second transparent conductive layer 142 are the carbon nanotube film 1220. In one embodiment, the first transparent conductive layer 122 is the carbon nanotube film 1220, and the second transparent conductive layer 142 is ITO layer, antimony yin oxide (ATO) layer, or conductive polymer layer.

Referring to FIGS. 3-6, the carbon nanotube film 1220 includes a plurality of carbon nanotubes. In one embodiment, the carbon nanotube film 1220 can be a pure structure consisting of only the plurality of carbon nanotubes. The carbon nanotube film 1220 is a free-standing structure. The term "free-standing structure" includes, but is not limited to, the fact that the carbon nanotube film 1220 can sustain the weight of itself when it is hoisted by a portion thereof without any significant damage to its structural integrity. The carbon nanotube film 1220 has resistance anisotropy.

The carbon nanotube film 1220 includes a plurality of carbon nanotube wires 1222 spaced from each other and a plurality of carbon nanotube clusters 1224 joined to the plurality of carbon nanotube wires 1222 by van der Waals attractive force. The plurality of carbon nanotube wires 1222 are connected by the plurality of carbon nanotube clusters 1224 so that the carbon nanotube film 1220 is firm and has high strength. The plurality of carbon nanotube clusters 1224 are separated by the plurality of carbon nanotube wires 1222. The carbon nanotube clusters 1224 between each adjacent two of the plurality of carbon nanotube wires 1222 are spaced from each other.

The plurality of carbon nanotube wires 1222 are parallel with each other, extend along the X direction, and spaced from each other along the Y direction. The X direction is perpendicular with the Y direction. The plurality of carbon nanotube wires 1222 form a plurality of conductive paths along the X direction. The plurality of carbon nanotube wires 1222 are coplanar. The plurality of carbon nanotube wires 1222 can be located equidistantly with each other. The distance between the adjacent two of the plurality of carbon nanotube wires 1222 can be above 0.1 millimeters. The cross-section of each of the plurality of carbon nanotube wires 1222 can be elliptical, rectangular, triangular or round. The effective diameter of each of the plurality of carbon nanotube wires 1222 can be in a range from about 0.1 micrometers to about 100 micrometers. In one embodiment, the effective diameter of each of the plurality of carbon nanotube wires 1222 can be in a range from about 5 micrometers to about 50 micrometers. The term "effective diameter" means the maximum length of the cross-section of each of the plurality of carbon nanotube wires 1222. Each of the plurality of carbon nanotube wires 1222 includes a plurality of carbon nanotubes arranged to extend along a length direction of the plurality of carbon nanotube wires 1222 that is parallel to the X direction. The plurality of carbon nanotubes are joined end to end by van der Waals attractive force between. Thus, the carbon nanotube film 1220 has the smallest resistance along the X direction parallel to the surface of the carbon nanotube film 1220.

Figure 3:
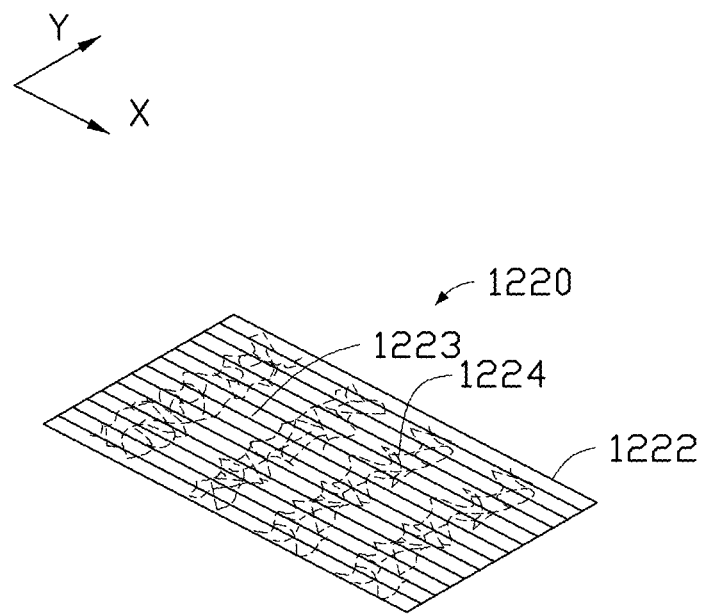
FIG. 3 is a schematic view of one embodiment of a carbon nanotube film of a resistance-type touch panel.
Figure 4:
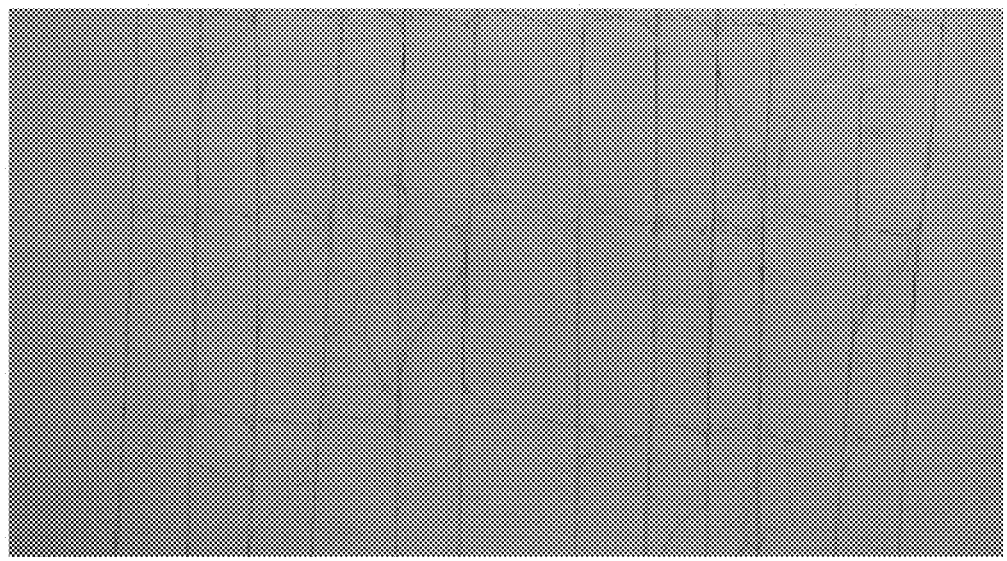
FIG. 4 is an optical microscope image of one embodiment of a carbon nanotube film.
Figure 5:
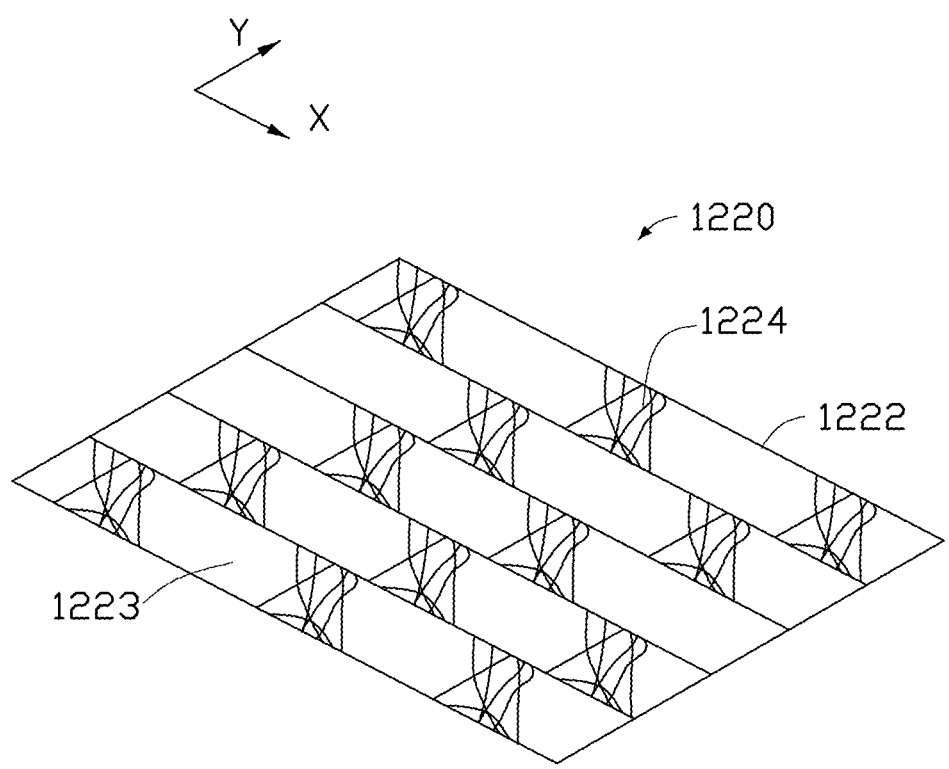
FIG. 5 is a schematic view of another embodiment of a carbon nanotube film of a resistance-type touch panel.
Figure 6:
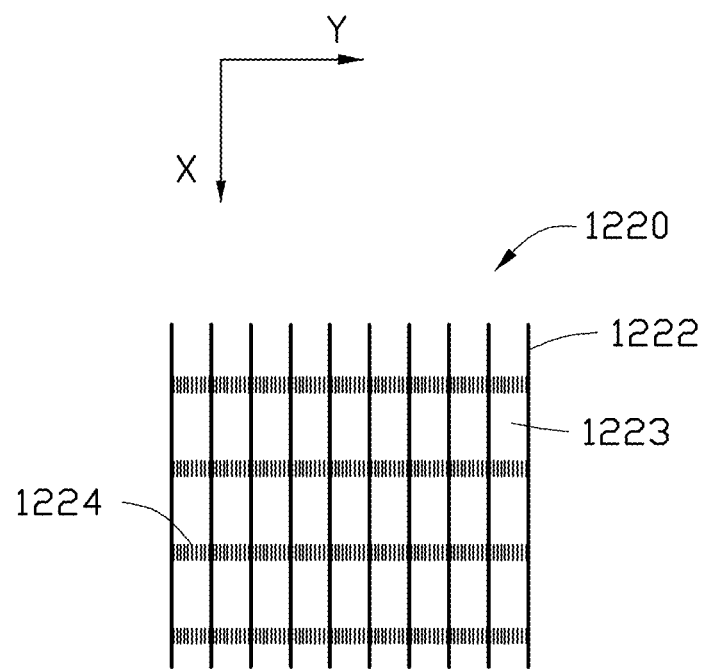
FIG. 6 is a schematic view of another embodiment of a carbon nanotube film of a resistance-type touch panel.

The plurality of carbon nanotube clusters 1224 can be spaced from each other, located between the plurality of carbon nanotube wires 1222, and in contact with the plurality of carbon nanotube wires 1222. Thus, the carbon nanotube film 1220 forms a free-standing structure. Each of the plurality of carbon nanotube clusters 1224 can be located between adjacent two of the plurality of carbon nanotube wires 1222 and joined with the adjacent two of the plurality of carbon nanotube wires 1222 by van der Waals attractive force. The plurality of carbon nanotube clusters 1224 can be connected with each other to form a conductive path along the Y direction. The length of each of the plurality of carbon nanotube clusters 1224 along the Y direction can be the same as the distance between the adjacent two of the plurality of carbon nanotube wires 1222. The length of each of the plurality of carbon nanotube clusters 1224 along the Y direction is greater than 0.1 millimeters. The carbon nanotube clusters 1224 between the adjacent two of the plurality of carbon nanotube wires 1222 are spaced from each other. Namely, the plurality of carbon nanotube clusters 1224 are spaced from each other along the X direction. The distance between two of the plurality of carbon nanotube clusters 1224 along the X direction is greater than 1 millimeter. In one embodiment, the plurality of carbon nanotube clusters 1224 are arranged to form an array as shown in FIGS. 3 and 6. Alternatively, adjacent two of the carbon nanotube clusters 1224 arranged along the Y direction can be dislocated as shown in FIG. 5, namely, the carbon nanotube clusters 1224 are not arranged to form a row along the Y direction.

The carbon nanotubes of each carbon nanotube cluster 1224 are joined by van der Waals attractive force. An angle between the axial direction of each carbon nanotube of the carbon nanotube cluster 1224 and the X direction is greater than 0 degrees and less than or equal to 90 degrees. In one embodiment, the angle between the axial direction of each carbon nanotube and the X direction is greater than or equal to 45 degrees and less than or equal to 90 degrees as shown in FIGS. 3 and 5. In one embodiment, the angle between the axial direction of each carbon nanotube and the X direction is greater than or equal to 60 degrees and less than or equal to 90 degrees. Thus, the carbon nanotubes of each carbon nanotube cluster 1224 can be intercrossed with each other to form a net structure.

The carbon nanotube film 1220 can be a pure structure consisting of only the plurality of carbon nanotubes. The carbon nanotube film 1220 defines a plurality of holes 1223 between the plurality of carbon nanotube wires 1222 and the plurality of carbon nanotube clusters 1224. When the plurality of carbon nanotube wires 1222 and the plurality of carbon nanotube clusters 1224 are arranged regularly, the plurality of holes 1223 are also arranged regularly. For example, when the plurality of carbon nanotube wires 1222 and the plurality of carbon nanotube clusters 1224 are arranged to form an array, the plurality of holes 1223 are also arranged to form an array. A dutyfactor of the carbon nanotube film 1220 is an area ratio between the total area of the plurality of carbon nanotube wires 1222 and the plurality of carbon nanotube clusters 1224 and the total area of the plurality of holes 1223, namely, the ratio between the total area of the plurality of carbon nanotubes of the carbon nanotube film 1220 and the total area of the plurality of holes 1223. The dutyfactor of the carbon nanotube film 1220 can be greater than 0 and less than or equal to 1:19. In one embodiment, the dutyfactor of the carbon nanotube film 1220 is greater than 0 and less than or equal to 1:49 so that the light transmittance of the carbon nanotube film 1220 is greater than 95%. In one embodiment, the light transmittance of the carbon nanotube film 1220 is greater than 98%. Thus, the clarity of the resistance-type touch panel 10 can be improved.

Furthermore, the carbon nanotube film 1220 may include a minority of dispersed carbon nanotubes located around the plurality of carbon nanotube wires 1222 and the plurality of carbon nanotube clusters 1224. The minority of dispersed carbon nanotubes have little effect on the properties of the carbon nanotube film 1220.

The plurality of carbon nanotube wires 1222 can form a plurality of first conductive paths along the X direction. The plurality of carbon nanotube clusters 1224 can form a plurality of second conductive paths along the Y direction as shown in FIG. 3. The plurality of first conductive paths are spaced from each other along the Y direction and the plurality of second conductive paths are spaced from each other along the X direction. Thus, the carbon nanotube film 1220 is electrical conductive both along the X direction and the Y direction. The carbon nanotube film 1220 is resistance anisotropy having the resistance along the Y direction greater than the resistance along the X direction. The resistance ratio between the resistance along the Y and the resistance along the X direction is greater than or equal to 10. In one embodiment, the resistance ratio between the resistance along the Y and the resistance along the X direction is greater than or equal to 20. In one embodiment, the resistance ratio between the resistance along the Y and the resistance along the X direction is greater than or equal to 50.

The carbon nanotube film 1220 of FIG. 3 or FIG. 5 can be made by following steps:

step (a), providing a drawn carbon nanotube film, wherein the drawn carbon nanotube film is drawn from a carbon nanotube array and includes a plurality of successive and oriented carbon nanotubes joined end-to-end by van der Waals attractive force therebetween and arranged to extend along the same direction;

step (b), patterning the drawn carbon nanotube film so that at least one row openings are formed on the drawn carbon nanotube film along the extending direction of the oriented carbon nanotubes, wherein each of the at least one row openings includes a plurality of openings spaced from each other;

step (c), shrinking the patterned drawn carbon nanotube film by treating the patterned drawn carbon nanotube film with an organic solvent, wherein the organic solvent is volatile and can be ethanol, methanol, acetone, dichloromethane, or chloroform.

Referring to FIG. 6, in one embodiment, the axial direction of each carbon nanotube of the carbon nanotube clusters 1224 and the X direction can be greater than 0 degrees and less than or equal to 45 degrees. In one embodiment, the angle between the axial direction of each carbon nanotube of the carbon nanotube clusters 1224 and the X direction can be greater than or equal to 0 degrees and less than or equal to 30 degrees. In one embodiment, the axial directions of the carbon nanotubes of the carbon nanotube clusters 1224 are substantially parallel with the X direction, namely the carbon nanotubes of the carbon nanotube clusters 1224 are substantially parallel with the carbon nanotube wires 1222. The carbon nanotube film 1220 of FIG. 6 can be made by the method similar to the method for making the carbon nanotube film 1220 of FIG. 3 or FIG. 5 except that in step (c), the patterned drawn carbon nanotube film is treated with a water or an mixture of water and organic solvent. The water or the mixture of water and organic solvent has a smaller interfacial tension on the patterned drawn carbon nanotube film compare with pure organic solvent.

The first transparent conductive layer 122 or the second transparent conductive layer 142 can include a plurality of carbon nanotube films 1220 stacked with each other or a plurality of coplanar carbon nanotube films 1220 located side by side. The carbon nanotube wires 1222 of adjacent two of the plurality of carbon nanotube films 1220 can be overlapped and substantially parallel with each other. The carbon nanotube clusters 1224 of adjacent two of the plurality of carbon nanotube films 1220 can be overlapped or dislocated.

The carbon nanotube film 1220 can be located on the first substrate 120 or the second substrate 140 directly or adhered on the first substrate 120 or the second substrate 140 by an adhesive layer (not shown). The adhesive layer is configured to fix the carbon nanotube film 1220 on the first substrate 120 or the second substrate 140. The adhesive layer can be transparent, opaque, or translucent. The adhesive layer can be an UV glue layer or optically clear adhesive (OCA) layer. The OCA layer is a clear and transparent double-sided adhesive tape with a light transmittance greater than 99%. Material of the OCA layer is polymethyl methacrylate (PMMA), which also named as plexiglass or acrylic. The thickness of the adhesive layer can be in a range from about 1 nanometer to about 500 micrometers, for example, the thickness is in a range from about 1 micrometer to about 2 micrometers. In one embodiment, the adhesive layer is a PMMA layer with a thickness of 1.5 micrometers.

The peripheries of the first electrode plate 12 and the second electrode plate 14 are connected by the insulating frame 18. The plurality of dot spacers 16 are spaced from each other and located on the second conductive layer 142 or the first transparent conductive layer 122. The insulating frame 18 and the plurality of dot spacers 16 can be made of insulative resin or any other suitable insulative material. Insulation between the first electrode plate 12 and the second electrode plate 14 is provided by the insulating frame 18 and the plurality of dot spacers 16. It is to be understood that the plurality of dot spacers 16 are optional, particularly when the resistance-type touch panel 10 is relatively small. They serve as supports given the size of the span and the strength of the first electrode plate 12.

In operation of the resistance-type touch panel 10, a first voltage is supplied successively to the first electrode plate 12 and a second voltage is supplied successively to the second electrode plate 14. When the first electrode plate 12 or the second electrode plate 14 is pressed by with a finger, a pen or the like tool, the first electrode plate 12 or the second electrode plate 14 will be deformed at a position being pressed. Thus, the first transparent conductive layer 122 and the second transparent conductive layer 142 will be in contact and connected with each other. The pressed position can be detected by detecting the first voltage change of the first transparent conductive layer 122 along the Y direction and the second voltage change of the second transparent conductive layer 142 along the X direction.

The carbon nanotubes have good mechanical properties, good chemical stability, and good moisture resistance, thus, the carbon nanotube film 1220 of the resistance-type touch panel 10 also has the above advantages. Thus, the resistance-type touch panel 10 has good usability and long service life.

Figure 7:
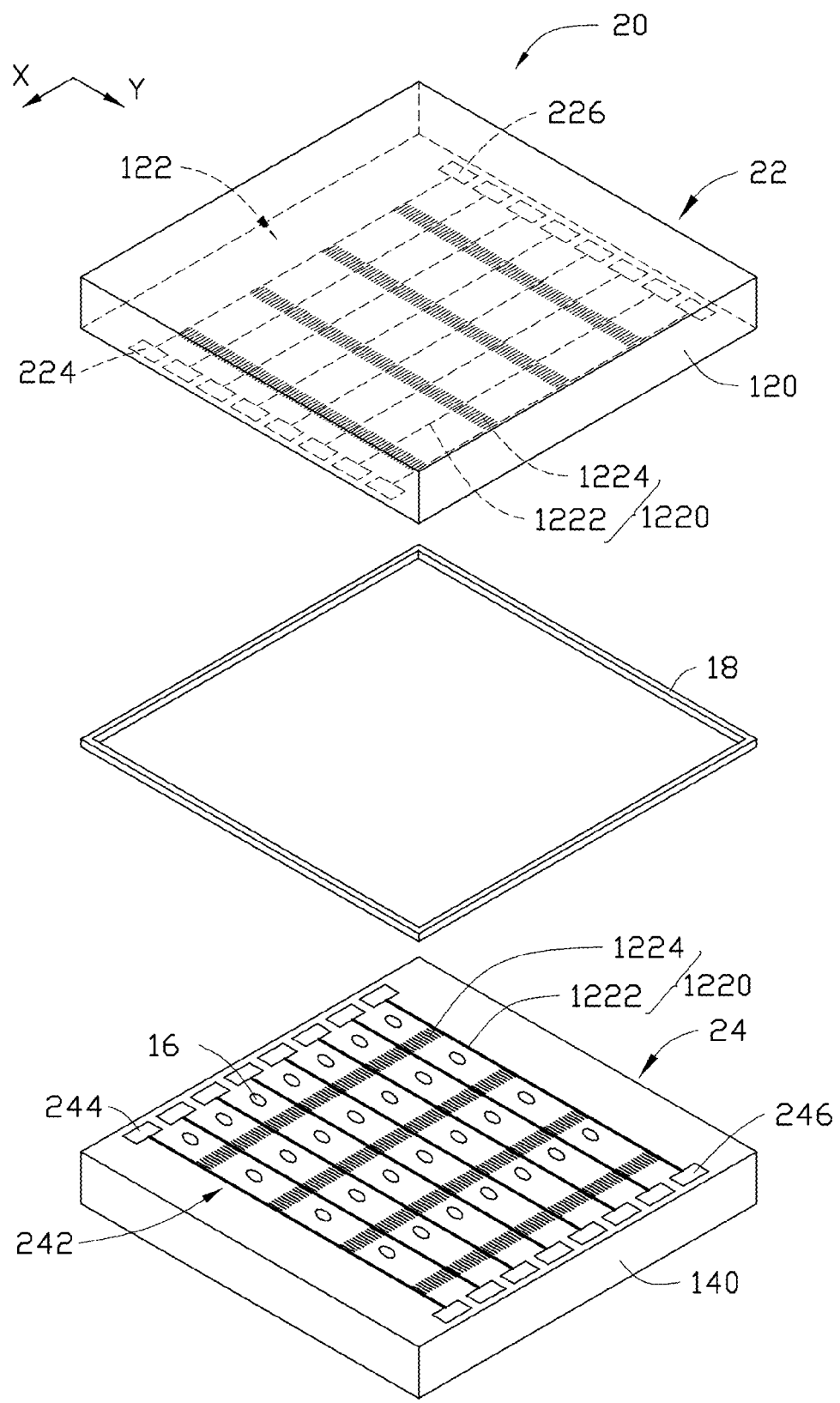
FIG. 7 is a schematic view of another embodiment of a resistance-type touch panel.

Referring to FIG. 7, a resistance-type touch panel 20 of one embodiment includes a first electrode plate 22, a second electrode plate 24, a plurality of dot spacers 16, and an insulating frame 18. The resistance-type touch panel 20 is similar as the resistance-type touch panel 10 above except that the first electrode plate 22 includes a plurality of first electrode 224, and a plurality of second electrode 226; and the second electrode plate 24 comprises a plurality of third electrode 244 and a plurality of fourth electrodes 246.

In one embodiment, the first transparent conductive layer 122 is the carbon nanotube film 1220 as shown in FIG. 6. The plurality of first electrodes 224 are spaced from each other and arranged along the Y direction. The plurality of second electrodes 226 are spaced from each other and arranged along the Y direction. The plurality of first electrodes 224 and the plurality of second electrodes 226 are located on two opposite sides of the first transparent conductive layer 122 and connected with the first transparent conductive layer 122. Each of the plurality of carbon nanotube wires 1222 of the carbon nanotube film 1220 is electrically connected with both one of the plurality of first electrode 224 and one of the plurality of second electrode 226. Each of the plurality of first electrode 224 and the plurality of second electrode 226 is electrically connected with a single one of the plurality of carbon nanotube wires 1222.

Because the carbon nanotube film 1220 is resistance anisotropy with different resistances along the X direction and the Y direction, the distances between the touch point and the electrodes 224 and 226 are different, the resistance between the touch point and the electrodes 224 and 226 are much different. Thus, the voltage change at the touch point is largest before and after being touched by the object. The coordinate of one or more of the touch points can be calculated and just according to the voltage difference detected at the electrodes 224 and 226. Because the plurality of carbon nanotube wires 1222 are electrically connected by the plurality of carbon nanotube clusters 1224, the voltage detected at the electrodes 224 and 226 includes the voltage of the corresponding carbon nanotube wire 1222 and the voltage of the corresponding carbon nanotube cluster 1224. Thus, the voltage change at the touch point is largest and significant before and after being touched by the object even if the touch pressure is small. The large and significant voltage changes can improve the detection accuracy of the resistance-type touch panel 10.

The second electrode plate 24 includes a second substrate 140, a second transparent conductive layer 242, a plurality of third electrodes 244, and a plurality of fourth electrodes 246. The second transparent conductive layer 242 has resistance anisotropy. The second transparent conductive layer 242 can be a patterned ITO layer, a patterned ATO layer, a patterned conductive polymer layer, or the carbon nanotube film 1220. The patterned ITO layer includes a plurality of rectangle ITO structures. The plurality of rectangle ITO structures extend along the Y direction and are spaced from each other along the X direction. The plurality of third electrodes 244 are spaced from each other and arranged along the X direction. The plurality of fourth electrodes 246 are spaced from each other and arranged along the X direction. The plurality of third electrodes 244 and the plurality of fourth electrodes 246 are located on two opposite sides of the second transparent conductive layer 242 and connected with the second transparent conductive layer 242. In one embodiment, the second transparent conductive layer 242 is the carbon nanotube film 1220 with the plurality of carbon nanotube wires 1222 extending along the Y direction. Each of the plurality of carbon nanotube wires 1222 of the second transparent conductive layer 242 is electrically connected with both one of the plurality of third electrodes 244 and one of the plurality of fourth electrodes 246. Each one of the plurality of third electrodes 244 and the plurality of fourth electrodes 246 is electrically connected with a single of the plurality of carbon nanotube wires 1222.

In operation of the resistance-type touch panel 20, the third electrodes 244 and the fourth electrodes 246 are connected to the ground first. A high voltage is supplied to the first electrodes 224 and second electrodes 226 alternately. The X coordinate of pressed position can be detected by detecting the voltage change of the first electrodes 224 and the voltage change of second electrodes 226. Then the first electrodes 224 and second electrodes 226 are connected to the ground. A high voltage is supplied to the third electrodes 244 and the fourth electrodes 246 alternately. The Y coordinate of pressed position can be detected by detecting the voltage change of the third electrodes 244 and the voltage change of and the fourth electrodes 246.

In one embodiment, the first electrode plate 22 can include a single second electrode 226 as long as a plurality of conductive paths can be formed by the carbon nanotube film 1220 between the plurality of first electrode 224 and the single second electrode 226.

In one embodiment, the second electrode plate 24 can include a single third electrode 244, and a single fourth electrode 246 as long as the single third electrode 244 and the single fourth electrodes 246 are electrically connected with the second transparent conductive layer 242.

Figure 8:
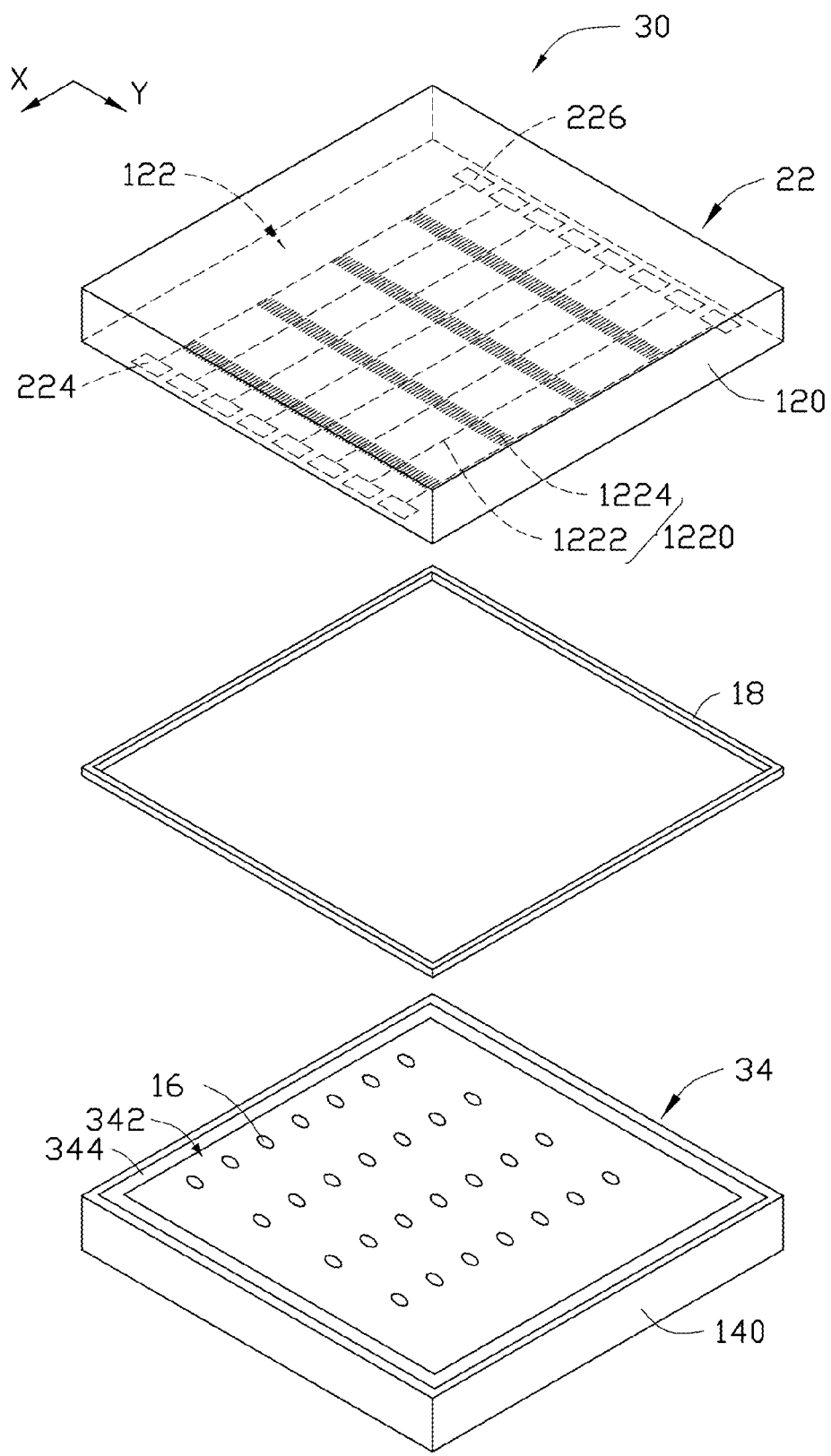
FIG. 8 is a schematic view of another embodiment of a resistance-type touch panel.

Referring to FIG. 8, a resistance-type touch panel 30 of one embodiment includes a first electrode plate 22, a second electrode plate 34, a plurality of dot spacers 16, and an insulating frame 18. The resistance-type touch panel 30 is similar as the resistance-type touch panel 20 above except that the second electrode plate 34 includes a second transparent conductive layer 342 and a single third electrode 344.

The second transparent conductive layer 342 includes has isotropic resistance. The second transparent conductive layer 342 can be an ITO layer, an ATO layer, or a conductive polymer layer. In one embodiment, the second transparent conductive layer 342 is an ITO layer. The third electrode 344 is located on the periphery of second transparent conductive layer 342 to form a frame structure and electrically connected with the second transparent conductive layer 342.

In operation of the resistance-type touch panel 30, the third electrode 344 is connected to the ground, and a stable direct voltage is supplied to the second electrodes 226, such as about 10V. The coordinate of pressed position can be detected by detecting the voltage change of the first transparent conductive layer 122 at the pressed position via the first electrodes 224 and the second electrodes 226.

Alternatively, the second electrode plate 34 can be the same as the second electrode plate 14 above.

It is to be understood that the above-described embodiments are intended to illustrate rather than limit the disclosure. Any elements described in accordance with any embodiments is understood that they can be used in addition or substituted in other embodiments. Embodiments can also be used together. Variations may be made to the embodiments without departing from the spirit of the disclosure. The above-described embodiments illustrate the scope of the disclosure but do not restrict the scope of the disclosure.

Depending on the embodiment, certain of the steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

What is claimed is:

1. A resistance-type touch panel comprising:
a first electrode plate, wherein the first electrode plate comprises a first substrate and a first transparent conductive layer located on the first substrate; and
a second electrode plate, wherein the second electrode plate comprises a second substrate and a second transparent conductive layer located on the second substrate; and the second transparent conductive layer is spaced from and opposite to the first transparent conductive layer;
wherein the first transparent conductive layer comprises a carbon nanotube film; the carbon nanotube film comprises a plurality of carbon nanotube wires, that are substantially parallel with each other, and a plurality of carbon nanotube clusters located between the plurality of carbon nanotube wires; the plurality of carbon nanotube wires extend along an X direction and are spaced from each other along a Y direction, some of the plurality of carbon nanotube clusters, between each adjacent two of the plurality of carbon nanotube wires, are spaced from each other along the X direction; and the X direction intersects with the Y direction.

2. The resistance-type touch panel of claim 1, wherein the carbon nanotube film consists of a plurality of carbon nanotubes.

3. The resistance-type touch panel of claim 1, wherein the plurality of carbon nanotube wires are connected by the plurality of carbon nanotube clusters, and the carbon nanotube film is a free-standing structure.

4. The resistance-type touch panel of claim 1, wherein the plurality of carbon nanotube clusters are joined to the plurality of carbon nanotube wires by van der Waals attractive force.

5. The resistance-type touch panel of claim 1, wherein each of the plurality of carbon nanotube wires comprises a plurality of carbon nanotubes arranged to extend along the X direction and joined end to end by van der Waals attractive force therebetween.

6. The resistance-type touch panel of claim 1, wherein a distance between adjacent two of the plurality of carbon nanotube wires is above 0.1 millimeters.

7. The resistance-type touch panel of claim 6, wherein a length of each of the plurality of carbon nanotube clusters along the Y direction is the same as the distance between the adjacent two of the plurality of carbon nanotube wires.

8. The resistance-type touch panel of claim 7, wherein the length of each of the plurality of carbon nanotube clusters along the Y direction is greater than 0.1 millimeters.

9. The resistance-type touch panel of claim 1, wherein a distance between adjacent two of the plurality of carbon nanotube clusters along the X direction is greater than 1 millimeter.

10. The resistance-type touch panel of claim 1, wherein a resistance ratio between a first resistance along the Y of the carbon nanotube film and a second resistance along the X direction of the carbon nanotube film is greater than or equal to 20.

11. The resistance-type touch panel of claim 1, wherein the first transparent conductive layer comprises two stacked carbon nanotube films.

12. The resistance-type touch panel of claim 1, wherein the first electrode plate further comprises a first electrode and a second electrode; the first electrode and the second electrode are electrically connected with the first transparent conductive layer; the second electrode plate further comprises a third electrode and a fourth electrode; and the third electrode and the fourth electrode are electrically connected with the second transparent conductive layer.

13. The resistance-type touch panel of claim 1, wherein the first electrode plate further comprises a plurality of first electrodes and a plurality of second electrodes; the plurality of first electrodes and the plurality of second electrodes are electrically connected with the first transparent conductive layer; the second electrode plate further comprises a plurality of third electrodes and a plurality of fourth electrodes; and the plurality of third electrodes and the plurality of fourth electrodes are electrically connected with the second transparent conductive layer.

14. The resistance-type touch panel of claim 1, wherein the first electrode plate further comprises a plurality of first electrodes and a plurality of second electrodes; the plurality of first electrodes and the plurality of second electrodes are electrically connected with the first transparent conductive layer; and the second electrode plate further comprises a single third electrode located on the periphery of second transparent conductive layer to form a frame structure and electrically connected with the second transparent conductive layer.

15. The resistance-type touch panel of claim 1, wherein the second transparent conductive layer comprises an indium tin oxide layer, an antimony yin oxide layer, a conductive polymer layer, or the carbon nanotube film.

16. A resistance-type touch panel comprising:
   a first electrode plate, wherein the first electrode plate comprises a first substrate and a first transparent conductive layer located on the first substrate; and
   a second electrode plate, wherein the second electrode plate comprises a second substrate and a second transparent conductive layer located on the second substrate; and the second transparent conductive layer is spaced from and opposite to the first transparent conductive layer;
   wherein the first transparent conductive layer comprises a carbon nanotube film; the carbon nanotube film comprises a plurality of carbon nanotube wires substantially parallel with each other and a plurality of carbon nanotube clusters located between the plurality of carbon nanotube wires; and the carbon nanotube film defines a plurality of holes, and a dutyfactor of the carbon nanotube film is less than or equal to 1:19.

17. The resistance-type touch panel of claim 16, wherein the dutyfactor of the carbon nanotube film is less than or equal to 1:49.

18. The resistance-type touch panel of claim 16, wherein a distance between adjacent two of the plurality of carbon nanotube wires is above 0.1 millimeters, and a length of each of the plurality of carbon nanotube clusters is the same as the distance between the adjacent two of the plurality of carbon nanotube wires.

19. The resistance-type touch panel of claim 18, wherein the plurality of carbon nanotube wires extend along an X direction and are spaced from each other along a Y direction, some of the plurality of carbon nanotube clusters, between each adjacent two of the plurality of carbon nanotube wires, are spaced from each other along the X direction; and the X direction intersects with the Y direction.

20. The resistance-type touch panel of claim 16, wherein the first electrode plate further comprises at least one first electrode and at least one second electrode; the at least one first electrode and the at least one second electrode are electrically connected with the first transparent conductive layer; and the second electrode plate further comprises at least one third electrode electrically connected with the second transparent conductive layer.

* * * * *